United States Patent
Kubo et al.

(10) Patent No.: US 11,593,568 B2
(45) Date of Patent: Feb. 28, 2023

(54) AGENT SYSTEM, AGENT PROCESSING METHOD, AND NON-TRANSITORY STORAGE MEDIUM THAT STORES AN AGENT PROCESSING PROGRAM

(71) Applicant: TOYOTA JIDOSHA KABUSHIKI KAISHA, Toyota (JP)

(72) Inventors: Chikage Kubo, Chofu (JP); Keiko Nakano, Kawasaki (JP); Eiichi Maeda, Itabashi-ku (JP); Hiroyuki Nishizawa, Itabashi-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 17/096,364

(22) Filed: Nov. 12, 2020

(65) Prior Publication Data
US 2021/0209316 A1    Jul. 8, 2021

(30) Foreign Application Priority Data
Jan. 8, 2020   (JP) .............................. JP2020-001601

(51) Int. Cl.
| | |
|---|---|
| G10L 15/00 | (2013.01) |
| G10L 15/22 | (2006.01) |
| G06F 16/00 | (2019.01) |
| G06F 40/55 | (2020.01) |
| G06F 40/237 | (2020.01) |

(52) U.S. Cl.
CPC ............ *G06F 40/55* (2020.01); *G06F 40/237* (2020.01)

(58) Field of Classification Search
CPC .......... G06F 16/3344; G06F 16/90332; G06F 40/56; G10L 15/00; G10L 15/22
See application file for complete search history.

(56) References Cited

U.S. PATENT DOCUMENTS

| | | | | |
|---|---|---|---|---|
| 9,152,698 | B1* | 10/2015 | Dhamdhere | ........... G06F 16/332 |
| 11,055,355 | B1* | 7/2021 | Monti | ................ G06F 16/90332 |
| 2012/0303356 | A1 | 11/2012 | Boyle et al. | |
| 2015/0363393 | A1* | 12/2015 | Williams | ................. G06F 40/58 |
| | | | | 704/8 |
| 2016/0117360 | A1 | 4/2016 | Kunc et al. | |
| 2019/0294678 | A1* | 9/2019 | Sapugay | ................ G06F 40/211 |
| 2020/0272692 | A1* | 8/2020 | Maan | ........................ G06F 40/56 |
| 2021/0133224 | A1* | 5/2021 | Tiwari | ................ G06F 16/3344 |
| 2021/0134299 | A1* | 5/2021 | Bender | ................ G06F 16/9535 |

FOREIGN PATENT DOCUMENTS

| | | |
|---|---|---|
| DE | 11 2012 001 750 T5 | 2/2014 |
| JP | 2001-141500 A | 5/2001 |

* cited by examiner

*Primary Examiner* — Shreyans A Patel
(74) *Attorney, Agent, or Firm* — Oblon, McClelland, Maier & Neustadt, L.L.P.

(57) ABSTRACT

An agent system includes a first memory and a first processor coupled to the first memory. The first processor analyzes contents of a verbal question, and carries out pre-processing that replaces vocabulary, which is used in the contents of the question, with homogenized vocabulary, and generates response information based on results of analysis. In a case in which there exists substitution vocabulary that has replaced original vocabulary in the pre-processing, the first processor changes the response information such that it can be recognized that the substitution vocabulary in the response information is synonymous with the original vocabulary, and outputs the response information.

18 Claims, 5 Drawing Sheets

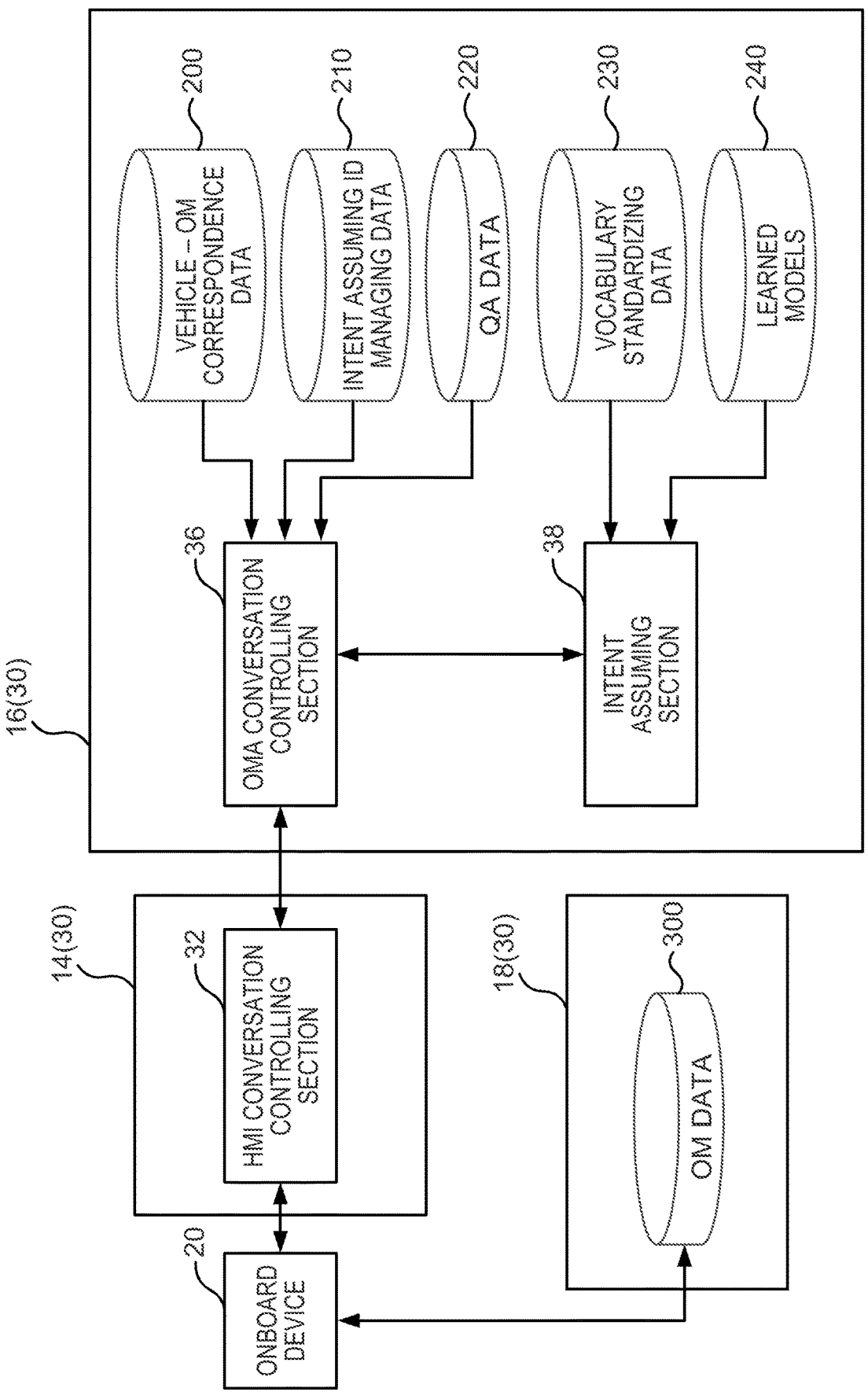

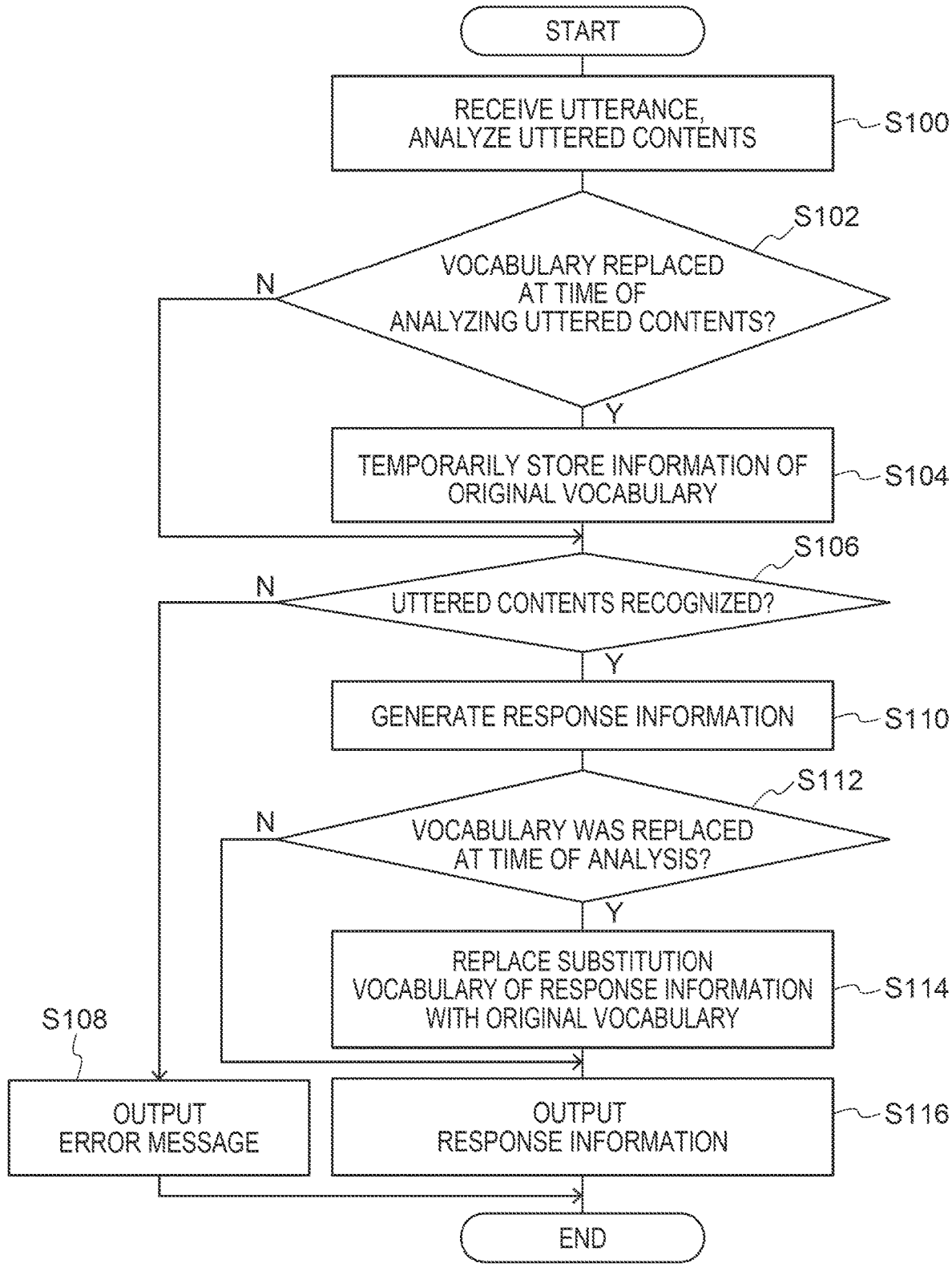

AGENT SYSTEM, AGENT PROCESSING METHOD, AND NON-TRANSITORY STORAGE MEDIUM THAT STORES AN AGENT PROCESSING PROGRAM

CROSS-REFERENCE TO RELATED APPLICATION

This application is based on and claims priority under 35 USC 119 from Japanese Patent Application No. 2020-001601 filed on Jan. 8, 2020, the disclosure of which is incorporated by reference herein.

BACKGROUND

Technical Field

The present disclosure relates to an agent system, an agent processing method, and a non-transitory storage medium that stores an agent processing program, which can provide explanation regarding a device, provide explanation regarding operation, and the like.

Japanese Patent Application Laid-Open (JP-A) No. 2001-141500 discloses an agent processing device for a vehicle that provides information relating to the operating of various onboard units.

In detail, in the vehicle agent processing device, voice recognition is carried out when voice information, which includes a natural voice, is given as a signal that is received at a wireless communication section. Thereafter, in a case of email, the meaning thereof is interpreted by carrying out syntactic analysis on the email as is, and information, which relates to operation of any of various onboard units within an automobile, is selected and is preferentially summarized, and this information is synthesized into a voice and outputted from a speaker. Further, in a case in which it is assumed that operation of any of various onboard units is necessary, that fact is judged automatically by an agent processing system, and spoken guidance is given by adding operation guiding information relating to that onboard unit.

However, in a case in which a question is posed by using the function name that the user knows, or an abbreviation or visual information, at the time when a response is given by substituting these with the formal name or the common name or the like, if the user does not know the formal name, there is the possibility that it will not be possible to judge whether the response to the question is proper or not.

SUMMARY

The present disclosure provides an agent device, an agent system, and an agent program that can output contents of a response that can be understood by a user, even in a case in which the user does not know formal names or common names or the like.

An agent device of a first aspect includes a voice analyzing section that analyzes contents of a verbal question, and carries out pre-processing that replaces vocabulary, which is used in the contents of the question, with homogenized vocabulary, and an outputting section that generates response information based on results of analysis by the voice analyzing section, and, in a case in which there exists substitution vocabulary that has replaced original vocabulary in the pre-processing, changes the response information such that it can be recognized that the substitution vocabulary in the response information is synonymous with the original vocabulary, and outputs the response information.

In accordance with the first aspect, at the voice analyzing section, the contents of a verbal question are analyzed, and pre-processing is carried out that substitutes vocabulary, which is used in the contents of the question, with homogenized vocabulary. Then, at the outputting section, response information is generated based on the results of analysis by the voice analyzing section, and, in a case in which there exists substitution vocabulary which replaced the original vocabulary in the pre-processing, the response information is changed such that it can be recognized that the substitution vocabulary in the response information is synonymous with the original vocabulary, and the response information is outputted. Due thereto, even in a case in which the user does not know of the formal name or the common name or the like, response information that the user can understand can be outputted.

Note that, in a second aspect, the outputting section may replace the substitution vocabulary with the original vocabulary, and output the response information. Due thereto, the response information is outputted by using the original vocabulary that was used at the time when the question was posed. Therefore, a response is not given by using vocabulary that the user does not understand.

Further, in a third aspect, the outputting section may make the substitution vocabulary and the original vocabulary correspond, and output the response information. Due thereto, even if the original vocabulary at the time when the question was asked is replaced and there is vocabulary that the user does not know, the user can understand the response information because the substitution vocabulary and the original vocabulary are made to correspond to one another.

In a fourth aspect, the outputting section may carry out a change such that the original vocabulary is listed after the substitution vocabulary, or carry out a change such that the substitution vocabulary is listed after the original vocabulary, and output the response information. Due thereto, the correspondence between the original vocabulary at the time the question was posed and the substitution vocabulary can be understood.

Further, in a fifth aspect, the voice analyzing section may analyze contents of a question relating to a manual of the vehicle. Due thereto, due to the voice analyzing section recognizing the uttered contents that are specialized with respect to the manual of the vehicle, the accuracy of recognizing an utterance with respect to the manual of the vehicle can be improved.

An agent system of a sixth aspect includes, a voice analyzing section that analyzes contents of a verbal question, and carries out pre-processing that replaces vocabulary, which is used in the contents of the question, with homogenized vocabulary, an outputting section that generates response information based on results of analysis by the voice analyzing section, and, in a case in which there exists substitution vocabulary that has replaced original vocabulary in the pre-processing, changes the response information such that it can be recognized that the substitution vocabulary in the response information is synonymous with the original vocabulary, and outputs the response information; and an information providing device that is installed in the vehicle, and that has functions of detecting an utterance of a vehicle occupant, providing a detected utterance to the voice analyzing section, and giving notice of the response information outputted from the outputting section.

In accordance with the sixth aspect, at the voice analyzing section, the contents of a verbal question are analyzed, and pre-processing is carried out that substitutes vocabulary, which is used in the contents of the question, with homogenized vocabulary. Then, at the outputting section, response information is generated based on the results of analysis by the voice analyzing section, and, in a case in which there exists substitution vocabulary which replaced the original vocabulary in the pre-processing, the response information is changed such that it can be recognized that the substitution vocabulary in the response information is synonymous with the original vocabulary, and the response information is outputted.

Further, the information processing device is installed in the vehicle, detects an utterance of the vehicle occupant, provides the contents of the detected utterance to the voice analyzing section, and gives notice of the response information that is outputted from the outputting section.

Due thereto, at the time when a question is posed by an utterance to the information providing device that is installed in the vehicle, and a response is obtained, even in a case in which the user does not know of the formal name or the common name or the like, response information that the user can understand can be obtained.

A seventh aspect is an agent program for causing a computer to function as the respective sections of the agent device of any one of the above-described first through fifth aspects.

As described above, in accordance with the present disclosure, there can be provided an agent device, an agent system, and an agent program that can output contents of a response that can be understood by a user, even in a case in which the user does not know formal names or common names or the like.

BRIEF DESCRIPTION OF THE DRAWINGS

Exemplary embodiments of the present invention will be described in detail based on the following figures, wherein:

FIG. 4 is a functional block drawing for describing functions of a manual providing system of the embodiment; and FIG. 5 is a flowchart showing an example of the flow of processings that are carried out by an agent server in the manual providing system relating to the embodiment.

DETAILED DESCRIPTION

Figure 1:
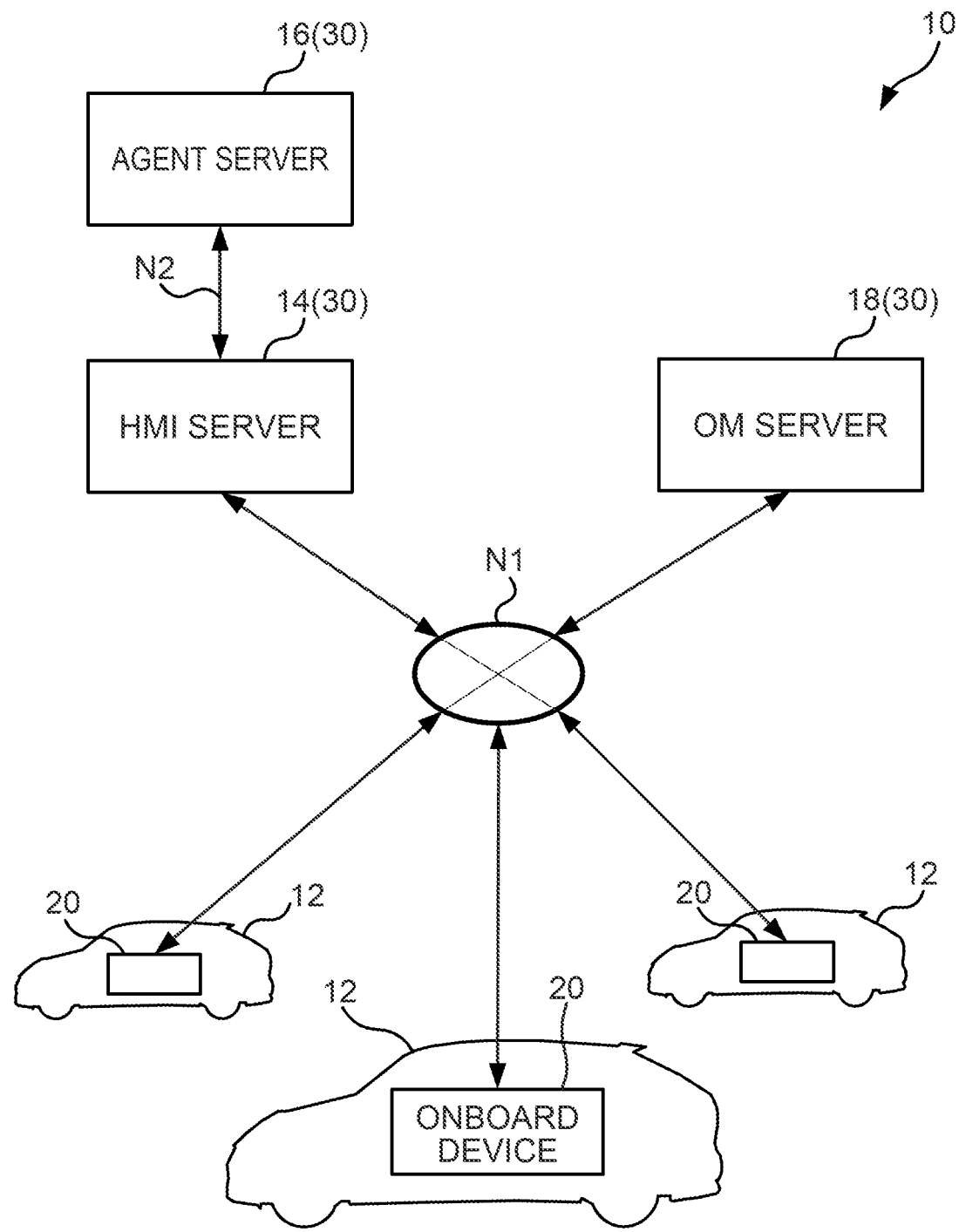
FIG. 1 is a block drawing showing the structure of a control device for a vehicle relating to a present embodiment.

An example of an embodiment of the present disclosure is described in detail hereinafter with reference to the drawings. In the present embodiment, explanation is given by using a manual providing system 10, which provides a manual of a vehicle, as an example of the agent system. FIG. 1 is a drawing showing the schematic structure of the manual providing system relating to the present embodiment.

As shown in FIG. 1, as an example, the manual providing system 10 of the present embodiment is configured to include plural vehicles 12 and plural servers 30. On onboard device 20 that serves as an information providing device is installed in each of the vehicles 12. The servers 30 include an HMI server 14 that functions as a Human Machine Interface (abbreviated as "HMI"), an agent server 16, and an owners manual (hereinafter abbreviated as "OM" upon occasion) server 18. Note that the agent server 16 corresponds to the agent device.

The onboard devices 20 of the respective vehicles 12, the HMI server 14 and the OM server 18 are respectively connected to one another via network N1. Further, the HMI server 14 and the agent server 16 are connected to one another through network N2.

(Vehicle)

Figure 2:
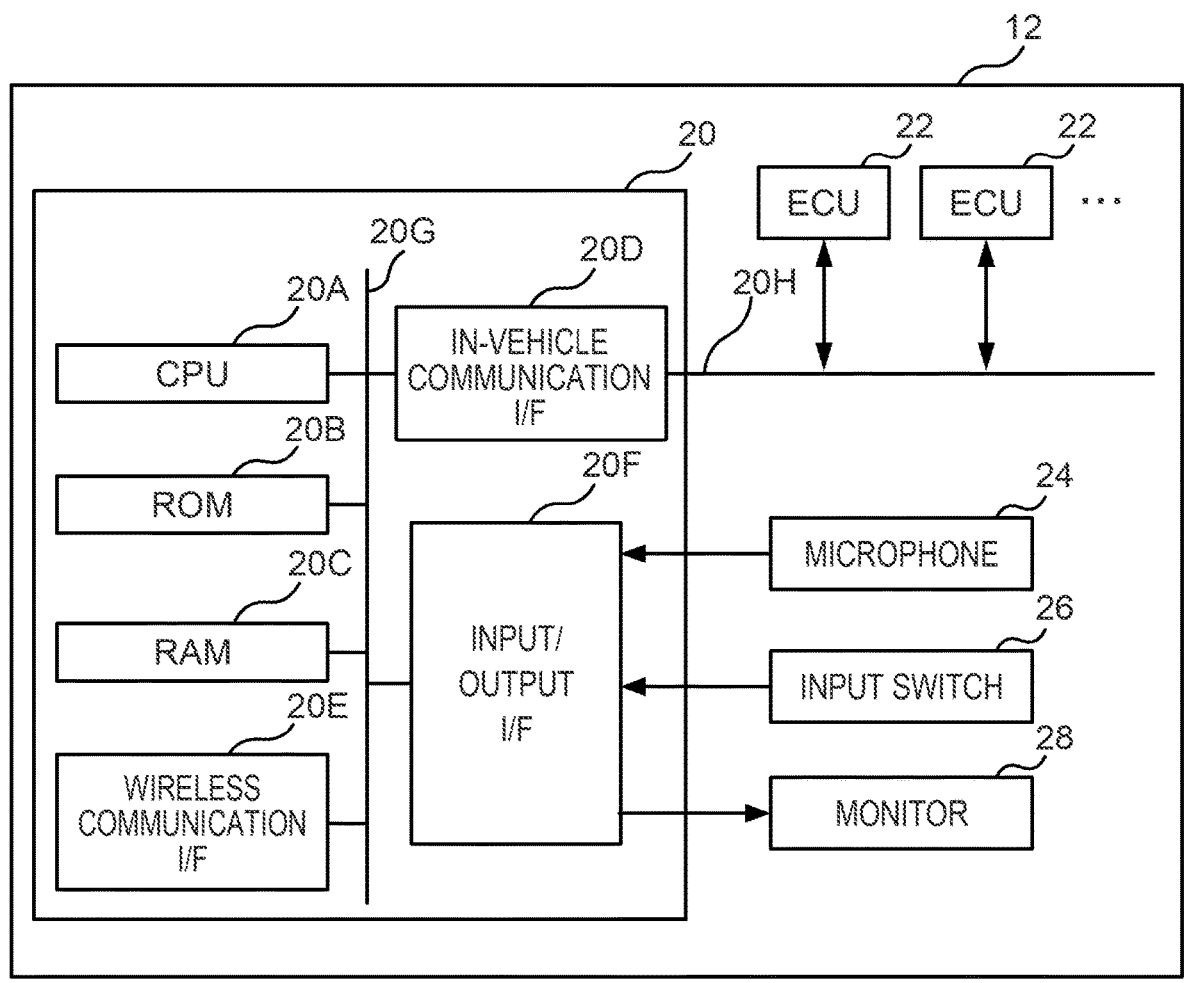
FIG. 2 is a block drawing showing hardware structures of the vehicle of the embodiment.

First, the hardware structures of the vehicle 12 are described. FIG. 2 is a block drawing showing the hardware structures of the vehicle of the present embodiment.

As shown in FIG. 2, the vehicle 12 relating to the present embodiment is configured to include the onboard device 20, plural ECUs 22, a microphone 24, an input switch 26 and a monitor 28.

The onboard device 20 is configured to include a CPU (Central Processing Unit) 20A, a ROM (Read Only Memory) 20B, a RAM (Random Access Memory) 20C, an in-vehicle communication I/F (Interface) 20D, a wireless communication I/F 20E, and an input/output I/F 20F. The CPU 20A, the ROM 20B, the RAM 20C, the in-vehicle communication I/F 20D, the wireless communication V/F 20E and the input/output I/F 20F are connected to be able to communicate with one another via an internal bus 20G.

The CPU 20A that serves as the second processor is a central computing processing unit, and executes various programs, and controls the respective sections. Namely, the CPU 20A reads-out a program from the ROM 20B that serves as the second memory, and executes the program by using the RAM 20C as a workspace.

The ROM 20B stores various programs and various data. A control program for controlling the onboard device 20 is stored in the ROM 20B of the present embodiment.

The RAM 20C temporarily stores programs and data as a workspace at the time of execution of various programs by the CPU 20A, as described above.

The in-vehicle communication l/F 20D is an interface for connection with the ECUs 22. This interface uses communication standards in accordance with CAN protocol. The in-vehicle communication I/F 20D is connected to an external bus 20H. There are plural ECUs 22 provided for the functions of the vehicle 12, respectively. Examples of the ECUs 22 of the present embodiment are a vehicle control ECU, an engine ECU, a brake ECU, a body ECU, a camera ECU, a multimedia ECU, and the like.

The wireless communication I/F 20E is a wireless communication module for communication with the servers 30. This wireless communication module uses communication standards of, for example, 5G, LTE, Wi-Fi®, or the like. The wireless communication I/F 20E is connected to the network N1.

The input/output I/F 20F is an interface for communicating with the microphone 24, the input switch 26 and the monitor 28 that are installed in the vehicle 12.

The microphone 24 is provided at a front pillar or the dashboard or the like of the vehicle 12, and is a device that collects voices emitted by the vehicle occupants.

The input switch 26 is provided at the center console or the steering wheel or the like, and is a switch for input of operations by the fingers of a vehicle occupant. For example, a push-button-type ten-key or a touch pad or the like can be employed as the input switch 26.

The monitor 28 is provided at the center console or the meter panel, and is a liquid crystal monitor for displaying the owners manual or response information that is described later. The monitor 28 may be provided as a touch panel that also serves as the input switch 26.

(Servers)

Figure 3:
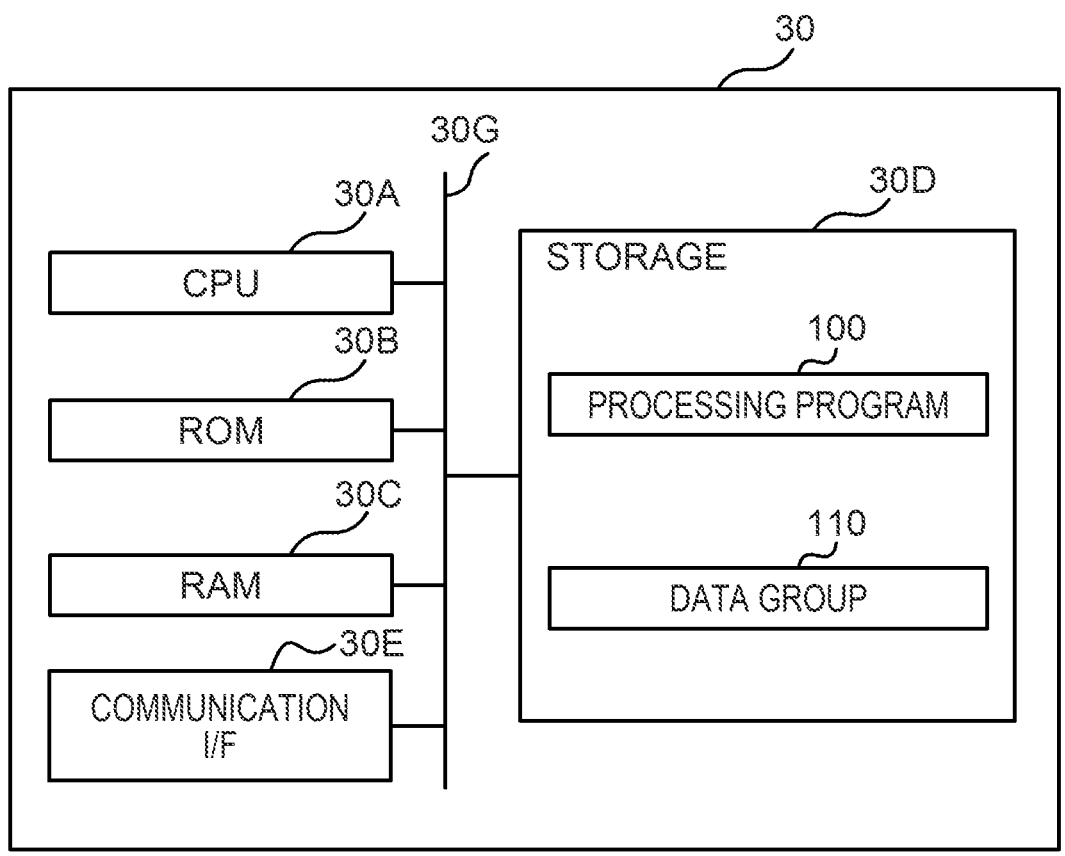
FIG. 3 is a block drawing showing hardware structures of a server of the embodiment.

The hardware structures of the servers 30 are described next. FIG. 3 is a block drawing showing the hardware structures of the server of the present embodiment.

As shown in FIG. 3, the server 30 is configured to include a CPU 30A that serves as the first processor, a ROM 30B that serves as the first memory, a RAM 30C, a storage 30D that serves as the first memory, and a communication I/F 30E. The CPU 30A, the ROM 30B, the RAM 30C, the storage 30D and the communication I/F 30E are connected to be able to communicate with one another via an internal bus 30G. The functions of the CPU 30A, the ROM 30B, the RAM 30C and the communication I/F 30E are the same as those of the above-described CPU 20A, ROM 20B, RAM 20C and wireless communication O/F 20E of the onboard device 20.

The storage 30D is configured by a non-volatile storage medium such as an HDD (Hard Disk Drive) or an SSD (Solid State Drive) or the like, and stores various programs and various data.

Here, the CPU 30A reads-out programs from the storage 30D, and executes the programs by using the RAM 30C as a workspace.

A processing program 100 and a data group 110 are stored in the storage 30D of the present embodiment. The processing program 100 is a program for realizing the respective functions of the server 30.

Functional structures of the manual providing system 10 of the present embodiment are described next. FIG. 4 is a functional block drawing for explaining the functions of the manual providing system of the embodiment.

(HMI Server)

The HMI server 14 has the functions of receiving questions from the onboard devices 20, and asking the agent server 16 for responses to questions relating to the owners manuals.

As shown in FIG. 4, at the HMI server 14 of the present embodiment, due to the CPU 30A executing the processing program 100, the CPU 30A functions as an HMI conversation controlling section 32.

The HMI conversation controlling section 32 carries out communication with the onboard devices 20. The HMI conversation controlling section 32 acquires voice information, which relates to a vehicle occupant of the vehicle 12 and is transmitted from the onboard device 20, and carries out voice recognition, and converts the voice information into text information. Based on the converted text information, the HMI conversation controlling section 32 understands the intent of the utterance of the vehicle occupant. Then, in a case in which the vehicle occupant has posed a question relating to the owners manual, the HMI conversation controlling section 32 makes an inquiry relating to that question to the agent server 16.

(Agent Server)

The agent server 16 functions as an agent (Owners Manual Agent, (hereinafter called "OMA")) that processes questions relating to owners manuals. From the HMI server 14, the agent server 16 acquires the vehicle information of the vehicle 12 and the text information relating to the question, and provides, to the HMI server 14, response information that relates to a response to the question.

At the agent server 16 of the present embodiment, due to the CPU 30A executing the processing program 100, the CPU 30A functions as an OMA conversation controlling section 36 and an intent assuming section 38. Note that the OMA conversation controlling section 36 corresponds to the outputting section, and the intent assuming section 38 corresponds to the voice analyzing section.

Further, the data group 110 of the agent server 16 includes vehicle—OM correspondence data 200, intent assuming ID managing data 210, QA data 220, vocabulary standardizing data 230, and learned models 240.

The vehicle—OM correspondence data 200 is data that associates vehicle information such as the vehicle type, the class, the accessories and the like of the vehicle 12, with OM numbers which are given to respective owners manuals.

The intent assuming ID managing data 210 is data that manages the OM numbers and intent assuming engine IDs that correspond to the OM numbers. The intent assuming engine ID is an ID that is given to each intent assuming engine that executes intent assuming processing that is described later. An intent assuming engine is provided for each of similar or related owners manuals.

The QA data 220 are data that hold response information associated with an intent label that is given to each response. Here, "intent label" is a label number that is provided as the result of assuming the intent from the uttered contents of the vehicle occupant. The response information includes text for display, images for display, text for reading-out, the URL for owners manual display, and the like, which are related to the response to the question.

The vocabulary standardizing data 230 is data that is for standardizing vocabulary and that is used in pre-processing of the intent assumption. Here, pre-processing is processing that replaces orthographic variations or variations in expression with predetermined homogenized vocabulary. For example, the vocabulary standardizing data 230 is information expressing that "off" and "off" are the same word, and includes data for homogenizing orthographic variations. As another example, the vocabulary standardizing data 230 is information indicating that "tire air pressure warning light" and "air pressure warning light" are the same thing, and includes data for homogenizing the different expressions. As yet another example, the vocabulary standardizing data 230 is information showing that "LKA" and "lane keeping assist" are the same thing, and includes data for homogenizing an abbreviation or the like with the formal name.

The learned models 240 are data generated by carrying out mechanical learning by using teaching data whose input is text information relating to plural phrasings that relate to a given question, and whose output is the intent label that relates to the response to that question. A model that has been learned for each OMA intent assuming engine is prepared in advance as the learned models 240. Further, models, which have been learned to associate abbreviations or formal names or similar expressions with a single response, are prepared as the learned models 240.

The OMA conversation controlling section 36 refers to the vehicle—OM correspondence data 200, and searches for and acquires, from the vehicle information of the vehicle 12, the OM number corresponding to that vehicle 12. In a case in which the OM number cannot be acquired, the OMA conversation controlling section 36 notifies the HMI conversation controlling section 32 that the OM is "not covered by this service". By referring to the intent assuming ID managing data 210, the OMA conversation controlling section 36 searches for and acquires, from the acquired OM number, the OMA intent assuming engine ID that is to be applied to the vehicle 12.

Further, the OMA conversation controlling section 36 makes an inquiry to the intent assuming section 38 by using the text information and the OMA intent assuming engine 1D as the input values, and acquires the intent label. In a case in which there is no corresponding intent label, the OMA conversation controlling section 36 notifies the HMI conversation controlling section 32 "not applicable". The OMA conversation controlling section 36 refers to the QA data 220, and searches for and acquires corresponding response information based on the acquired intent label and OM number.

The intent assuming section 38 uses the intent assuming engine of that intent assuming engine ID and acquires the intent label, and provides the intent label to the OMA conversation controlling section 36. First, the intent assuming section 38 carries out pre-processing on the text that relates to the text information acquired via the OMA conversation controlling section 36. Due to this pre-processing, the orthographic variations and variations in expression are homogenized. Then, by using the learned model 240 that has been prepared for that OMA intent assuming engine, the intent assuming section 38 carries out intent assuming processing on the text information that has been subjected to the pre-processing, and outputs an intent label corresponding to the text information, and computes a degree of certainty corresponding to that intent label. Then, the intent assuming section 38 notifies the OMA conversation controlling section 36 of an intent label whose degree of certainty is greater than or equal to a predetermined value.

(OM Server)

The OM server 18 is a server that provides owners manuals. The data group 110 of the OM server 18 includes OM data 300 that is HTML data relating to owners manuals. Note that the OM data 300 is read-out by specifying the URL for owners manual display, or the like, which is included in the response information that the QA data 220 has.

In the present embodiment, the processing of the intent assuming section 38 is carried out after execution of the processing of homogenizing the orthographic variations and variations in expression by using the vocabulary standardizing data 230. Therefore, there are cases in which a response is given in which vocabulary that is included in the response information is vocabulary that is different than that used at the time when the user posed the question. For example, in a case in which the user asks "What is LKA?", the intent assuming section 38 replaces "LKA" with "lane keeping assist" by using the vocabulary standardizing data 230. Accordingly, there are cases in which a response is given by using substitution vocabulary which is different than the original vocabulary in the question, such as "Lane keeping assist is . . . ". The user may not know that "LKA" and "lane keeping assist" are the same, and there are cases in which it cannot be judged whether a response to a question is proper or not.

Thus, in the present embodiment, in a case in which the intent assuming section 38 replaces the original vocabulary used in the question with substitution vocabulary by carrying out the above-described pre-processing, the intent assuming section 38 carries out processing for changing the response information such that it can be recognized that the substitution vocabulary in the response information is synonymous with the original vocabulary. Due thereto, the substitution vocabulary and the original vocabulary in the user's question can be recognized, and therefore, a response is not given by using vocabulary that is not understood. As an example, in the present embodiment, in a case in which the intent assuming section 38 replaces original vocabulary in the question with substitution vocabulary by carrying out the above-described pre-processing, the intent assuming section 38 carries out processing that returns the substitution vocabulary in the response to the original vocabulary that the user used in the question. Due thereto, by giving a response by using the vocabulary that the user used at the time of posing the question, a response is not given by using vocabulary that is not understood.

Concretely, in a case in which the intent assuming section 38 carries out pre-processing by using the vocabulary standardizing data 230 and replaces vocabulary with substitution vocabulary, the original vocabulary is temporarily stored as original vocabulary information in association with the substitution vocabulary. Then, the intent assuming section 38 notifies the OMA conversation controlling section 36 of the intent label together with the information of the original vocabulary. The OMA conversation controlling section 36 refers to the QA data 220, and searches for and acquires the corresponding response information based on the acquired intent label and OM number. Then, based on the original vocabulary information that is stored temporarily, the OMA conversation controlling section 36 returns the substitution vocabulary that is in the response information to the original vocabulary used at the time when the user posed the question, and notifies the HMI conversation controlling section 32. Due thereto, a list of response information can be displayed on the onboard device 20 via the HMI conversation controlling section 32. Because the response information is outputted by using the vocabulary with which the user asked the question, a response is not given with vocabulary that the user does not understand.

Concrete processings, which are carried out at the agent server 16 in the manual providing system 10 relating to the present embodiment that is configured as described above, are described next. FIG. 5 is a flowchart showing an example of the flow of processings that are carried out at the agent server 16 at the manual providing system 10 relating to the present embodiment. Note that the processings of FIG. 5 start in a case in which the HMI conversation controlling section 32 makes an inquiry, to the agent server 16, relating to a question of a vehicle occupant relating to the owners manual, and the OMA conversation controlling section 36 refers to vehicle—OM correspondence data 200, and searches for and acquires the OM number corresponding to the vehicle 12 from the vehicle information of the vehicle 12.

In step S100, the CPU 30A of the agent server 16 receives an utterance and analyzes the contents of the utterance, and moves on to step S102. Namely, the OMA conversation controlling section 36 refers to the vehicle—OM correspondence data 200, and, from the vehicle information of the vehicle 12, searches for and acquires the OM number corresponding to that vehicle 12. Further, the OMA conversation controlling section 36 refers to the intent assuming ID managing data 210, and, from the acquired OM number, searches for and acquires the OMA intent assuming engine ID that is applied to that vehicle 12. Then, the OMA conversation controlling section 36 makes an inquiry to the intent assuming section 38 by using, as the input values, the OMA intent assuming engine ID and the text information that has been subjected to voice recognition and converted by the HMI conversation controlling section 32. Due thereto, the intent assuming section 38 carries out pre-processing on the text that relates to the text information that was acquired via the OMA conversation controlling section 36. Further, the intent assuming section 38 uses the learned model 240 that was prepared for that OMA intent assuming engine, and outputs the intent label corresponding to the text information, and computes the degree of certainty that corresponds to that intent label, and notifies the OMA conversation controlling section 36 of an intent label whose degree of certainty is greater than or equal to a predetermined value. Note that step S100 is an example of the processing of the voice analyzing section.

In step S102, the CPU 30A of the agent server 16 judges whether or not vocabulary was replaced at the time of analyzing the uttered contents. In this judgement, the intent assuming section 38 carries out, as pre-processing and on the text relating to the text information that was acquired via the OMA conversation controlling section 36, processing that replaces orthographic variations or variations in expression or the like with predetermined homogenized vocabulary by using the vocabulary standardizing data 230, and judges whether or not replacement was carried out on the original vocabulary of the question. If this judgment is affirmative, the CPU 30A moves on to step S104. If this judgment is negative, the CPU 30A moves on to step S106.

In step S104, the CPU 30A of the agent server 16 temporarily stores the information of the original vocabulary, and moves onto step S106. For example, the original vocabulary of the question is temporarily stored as original vocabulary information, in association with the substitution vocabulary.

In step S106, the CPU 30A of the agent server 16 judges whether or not uttered contents have been recognized. In this judgement, the OMA conversation controlling section 36 judges whether or not the degree of certainty of the intent label assumed by the intent assuming section 38 exceeds a predetermined threshold value. If this judgment is negative, the CPU 30A moves on to step S108. If this judgment is affirmative, the CPU 30A moves on to step S110.

In step S108, the CPU 30A of the agent server 16 outputs an error message to the HMI server 14, and ends the series of processings. Due thereto, the HMI server 14 provides the onboard device 20 with the error notification "not applicable" for the response to the question.

On the other hand, in step S110, the CPU 30A of the agent server 16 generates response information, and moves on to step S112. Namely, the OMA conversation controlling section 36 refers to the QA data 220, and searches for and acquires the corresponding response information based on the intent label acquired from the intent assuming section 38 and the OM number. In a case in which the response information to the question is not limited to one, e.g., there are plural response information at which the degree of certainty of the intent label exceeds the threshold value, the plural response information are acquired.

In step S112, the CPU 30A of the agent server 16 judges whether or not vocabulary at the time of analyzing the uttered contents was replaced. In this judgement, it is judged whether or not original vocabulary information was temporarily stored by above step S104. If this judgment is affirmative, the CPU 30A moves on to step S114. If this judgment is negative, the CPU 30A moves on to step S116.

In step S114, the CPU 30A of the agent server 16 replaces the substitution vocabulary of the response information with the original vocabulary, and moves on to step S116. Namely, based on the information of the original vocabulary that was temporarily stored in above-described step S104, the CPU 30A replaces the substitution vocabulary that is used in the response information with the original vocabulary of the question, and moves on to step S116. Note that, after replacing the substitution vocabulary with the original vocabulary of the question, the CPU 30A deletes the information of the original vocabulary that was temporarily stored. Steps S110 through S114 are an example of the processing of the outputting section.

In step S116, the CPU 30A of the agent server 16 outputs the response information to the HMI conversation controlling section 32, and ends the series of processings. Due thereto, response information to the question is outputted from the HMI server 14 to the onboard device 20.

By carrying out processing in this way, at the intent assuming section 38, pre-processing is carried out, and, in a case in which vocabulary is replaced, processing that returns the vocabulary to the original vocabulary used by the user is carried out at the time of responding. Therefore, a response is given in the vocabulary that the user used at the time of uttering the question, and no response is given by using vocabulary that the user does not understand. Accordingly, even in a case in which the user does not know of the formal name or the common name or the like, response contents that can be understood by the user can be outputted.

Note that, in the above-described embodiment, pre-processing is carried out at the intent assuming section 38, and, in a case in which vocabulary is replaced, at the time of responding, the substitution vocabulary is returned to the original vocabulary used by the user, and due thereto, the response information is changed such that it can be recognized that the substitution vocabulary in the response information is synonymous with the original vocabulary. However, the present disclosure is not limited to this. For example, output may be carried out such that both the original vocabulary and the substitution vocabulary are included in the response information. Concretely, a situation is assumed in which, in the case of a question such as "What is LKA?", the intent assuming section 38 replaces the "LKA" with "lane keeping assist" in the pre-processing. In this case, response information such as "Lane keeping assist (LKA) is . . . " may be generated, and the response information may be reportably outputted such that the vocabulary of the question, in parentheses or the like, is listed after the substitution vocabulary. Or, as with "LKA (lane keeping assist) is . . . ", the information may be reportably outputted such that the substitution vocabulary, in parentheses or the like, is listed after the original vocabulary.

Further, although the above embodiment describes an example in which pre-processing is carried out at the intent assuming section 38, the present disclosure is not limited to this, and, for example, the pre-processing may be carried out at the OMA conversation controlling section 36. Further, although the above embodiment describes, as an example, a form in which the agent server 16 has the functions of the intent assuming section 38 and the OMA conversation controlling section 36, the present disclosure is not limited to this. For example, the intent assuming section 38 and the OMA conversation controlling section 36 may be made into a single function, or there may be a form in which these functions are further divided into even more functions.

In the above embodiment, the HMI server 14, the agent server 16 and the OM server 18 that structure the manual providing system 10 are made to be the different servers 30, but the server 30 that combines the functions of these respective servers 30 may be provided. For example, all of the HMI server 14, the agent server 16 and the OM server 18 may be combined into one, or some of the servers 30 may be combined together. Further, at the agent server 16, the functions of the OMA conversation controlling section 36 and the intent assuming section 38 may be set in respectively different servers 30.

Note that any of various types of processors other than a CPU may execute the various processings that the CPUs 20A, 30A execute by reading-out and executing software (programs) in the above-described embodiment. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the above-described processings that are carried out by the agent server 16 may be executed by one of these various types of processors, or may be executed by combining two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, the above embodiment describes a form in which the respective programs are stored in advance (are installed) in a non-transitory storage medium that can be read by a computer. For example, the processing program 100 in the server 30 is stored in advance in the storage 30D. However, the present disclosure is not limited to this, and the respective programs may be provided in the form of being stored on a non-transitory storage medium such as a CD-ROM (Compact Disc Read Only Memory), a DVD-ROM (Digital Versatile Disc Read Only Memory), a USB (Universal Serial Bus) memory, or the like. Further, the programs may be in a form of being downloaded from an external device via a network.

The flow of processings described in the above embodiment is an example, and unnecessary steps may be deleted, new steps may be added, or the order of processings may be rearranged, within a scope that does not depart from the gist of the present disclosure.

What is claimed is:

1. An agent system for a vehicle comprising:
a first memory; and
a first processor coupled to the first memory,
wherein the first processor is configured to
analyze contents of a verbal question by a vehicle occupant, which is received from an information providing device of the vehicle and includes content relating to an operation of the vehicle, and carry out pre-processing including processing that replaces vocabulary, which is used in the contents of the verbal question, with homogenized vocabulary that is completely different from original vocabulary, and
generate response information based on results of analysis, and, in a case in which substitution vocabulary has replaced original vocabulary in the pre-processing, change the response information to replace the substitution vocabulary in the response information with the original vocabulary such that the response information can be understood by the vehicle occupant without any further action from the vehicle occupant, output the response information, and transmit the response information to the information providing device.

2. The agent system of claim 1, wherein the first processor is configured to replace the substitution vocabulary with the original vocabulary, and output the response information.

3. The agent system of claim 1, wherein the first processor is configured to make the substitution vocabulary and the original vocabulary correspond, and output the response information.

4. The agent system of claim 3, wherein the first processor is configured to carry out a change such that the original vocabulary is listed after the substitution vocabulary, or to carry out a change such that the substitution vocabulary is listed after the original vocabulary, and output the response information.

5. The agent system of claim 1, wherein the first processor is configured to analyze contents of a question relating to a manual of the vehicle.

6. The agent system of claim 1, comprising:
a second memory; and
a second processor coupled to the second memory,
wherein the second processor is configured to detect an utterance of a vehicle occupant, provide a detected utterance to the first processor, and give notice of the response information.

7. An agent processing method for a vehicle comprising:
by a first processor,
analyzing contents of a verbal question by a vehicle occupant, which is received from an information providing device of the vehicle and includes content relating to an operation of the vehicle, and carrying out pre-processing including processing that replaces vocabulary, which is used in the contents of the verbal question, with homogenized vocabulary that is completely different from original vocabulary, and
generating response information based on results of analysis, and, in a case in which substitution vocabulary has replaced original vocabulary in the pre-processing, changing the response information to replace the substitution vocabulary in the response information with the original vocabulary such that the response information can be understood by the vehicle occupant without any further action from the vehicle occupant, outputting the response information, and transmitting the response information to the information providing device.

8. The agent processing method of claim 7, wherein the substitution vocabulary is replaced with the original vocabulary, and the response information is outputted, by the first processor.

9. The agent processing method of claim 7, wherein the substitution vocabulary and the original vocabulary are made to correspond to one another, and the response information is outputted, by the first processor.

10. The agent processing method of claim 9, further comprising listing the original vocabulary after the substitution vocabulary, or listing the substitution vocabulary after the original vocabulary, and outputting the response information, by the first processor.

11. The agent processing method of claim 7, wherein contents of a question relating to a manual of the vehicle are analyzed by the first processor.

12. The agent processing method of claim 7, further comprising, by a second processor, detecting an utterance of a vehicle occupant, providing the detected utterance to the first processor, and giving notice of the response information.

13. A non-transitory storage medium that stores a program executable by a first processor to perform agent processing for a vehicle, the agent processing comprising:
analyzing contents of a verbal question by a vehicle occupant, which is received from an information providing device of the vehicle and includes content relating to an operation of the vehicle, and carrying out pre-processing including processing that replaces vocabulary, which is used in the contents of the verbal question, with homogenized vocabulary that is completely different from original vocabulary, and generating response information based on results of analysis, and, in a case in which substitution vocabulary has replaced original vocabulary in the pre-processing, changing the response information to replace the substitution vocabulary in the response information with the original vocabulary such that the response information can be understood by the vehicle occupant without any further action from the vehicle occupant, outputting the response information, and transmitting the response information to the information providing device.

14. The non-transitory storage medium of claim 13, wherein the agent processing includes replacing the substitution vocabulary with the original vocabulary, and outputting the response information.

15. The non-transitory storage medium of claim 13, wherein the agent processing includes making the substitution vocabulary and the original vocabulary correspond, and outputting the response information.

16. The non-transitory storage medium of claim 15, wherein the agent processing includes listing the original vocabulary after the substitution vocabulary, or listing the substitution vocabulary after the original vocabulary, and outputting the response information.

17. The non-transitory storage medium of claim 13, wherein the agent processing includes analyzing contents of a question relating to a manual of the vehicle.

18. The non-transitory storage medium of claim 13, wherein the storage medium stores a program executable by a second processor to perform other agent processing that includes detecting an utterance of a vehicle occupant, providing a detected utterance to the first processor, and giving notice of the response information.

* * * * *